(12) United States Patent
Haniya et al.

(10) Patent No.: US 7,971,504 B2
(45) Date of Patent: Jul. 5, 2011

(54) ARTICULATED MANIPULATOR

(75) Inventors: Kazuhiro Haniya, Kitakyushu (JP);
Manabu Okahisa, Kitakyushu (JP);
Atsushi Ichibangase, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 468 days.

(21) Appl. No.: 12/088,283

(22) PCT Filed: Sep. 14, 2006

(86) PCT No.: PCT/JP2006/318284
§ 371 (c)(1),
(2), (4) Date: Mar. 27, 2008

(87) PCT Pub. No.: WO2007/037131
PCT Pub. Date: Apr. 5, 2007

(65) Prior Publication Data
US 2009/0114052 A1 May 7, 2009

(30) Foreign Application Priority Data

Sep. 27, 2005 (JP) ................................. 2005-279133

(51) Int. Cl.
*B25J 17/00* (2006.01)
(52) U.S. Cl. .................................................. 74/490.03
(58) Field of Classification Search ............... 74/490.01, 74/490.02, 490.03, 490.06; 414/918; 901/23, 901/24, 50
See application file for complete search history.

(56) References Cited

U.S. PATENT DOCUMENTS

| | | | | |
|---|---|---|---|---|
| 5,293,107 A | * | 3/1994 | Akeel | 318/568.11 |
| 5,303,333 A | * | 4/1994 | Hoos | 700/245 |
| 5,428,713 A | | 6/1995 | Matsumaru | |
| 5,523,662 A | | 6/1996 | Goldenberg et al. | |
| 6,125,715 A | * | 10/2000 | Nissfolk et al. | 74/490.02 |
| 6,250,174 B1 | * | 6/2001 | Terada et al. | 74/490.02 |
| 6,817,553 B2 | * | 11/2004 | Steur | 239/690 |
| 6,922,610 B2 | * | 7/2005 | Okamoto et al. | 700/245 |
| 2003/0010148 A1 | | 1/2003 | Okamoto et al. | |
| 2004/0138779 A1 | * | 7/2004 | Shibata et al. | 700/245 |
| 2004/0149064 A1 | * | 8/2004 | Narita et al. | 74/490.03 |

FOREIGN PATENT DOCUMENTS

| | | |
|---|---|---|
| DE | 2228598 A1 | 1/1974 |
| DE | 4244379 A1 | 6/1994 |
| DE | 19509050 A1 | 9/1996 |

(Continued)

OTHER PUBLICATIONS

Extended European Search Report dated Oct. 20, 2008.

(Continued)

*Primary Examiner* — Vicky A Johnson
(74) *Attorney, Agent, or Firm* — Ditthavong Mori & Steiner, P.C.

(57) ABSTRACT

This invention provides a manipulator that can facilitate a teaching method, improve the operation speed of an arm, and mount a heavy load in a narrow space. The manipulator includes a plurality of arm bodies provided in series, joint parts rotatably connecting two adjacent arm bodies, and the joint parts in which slope of rotation axes of the adjacent joints are 90 degrees, at least one linear body disposed in the joint parts coaxially with the rotation axes. The joint parts are composed of a servo motor, and a speed-reduction mechanism. The rotation axes of the servo motor, the speed-reduction mechanism and the joint parts become the same axis.

24 Claims, 4 Drawing Sheets

FOREIGN PATENT DOCUMENTS

| | | |
|---|---|---|
| DE | 102004002416 A1 | 10/2004 |
| EP | 0136719 A2 | 4/1985 |
| JP | 61-244475 A | 10/1986 |
| JP | 63-17790 | 1/1988 |
| JP | 1-127939 A | 5/1989 |
| JP | 10-166292 A | 6/1998 |
| JP | 10-225881 | 8/1998 |
| JP | 10-329079 A | 12/1998 |
| JP | 11-129183 A | 5/1999 |
| JP | 2000-141253 A | 5/2000 |
| JP | 2001-113488 A | 4/2001 |
| JP | 2003-025269 A | 1/2003 |
| JP | 2004-148449 A | 5/2004 |
| JP | 2005-014103 A | 1/2005 |
| JP | 2005-14108 A | 1/2005 |
| JP | 2005-46966 A | 2/2005 |
| JP | 2005/081499 A | 3/2005 |
| JP | 2005-177904 A | 7/2005 |
| WO | 99/01261 A1 | 1/1999 |
| WO | 01/51259 A2 | 7/2001 |

OTHER PUBLICATIONS

European Search Report dated Dec. 16, 2009.
European Search Report dated Aug. 28, 2009.
Chinese Office Action for corresponding CN Appl. No. 200680035659.4, Jun. 21, 2010.
European Office Action for corresponding EP Application No. 09 007 695.1—2316, Sep. 3, 2010.

* cited by examiner

ARTICULATED MANIPULATOR

TECHNICAL FIELD

The present invention relates to an articulated manipulator having a plurality of arm bodies, and joint parts that rotatably connect the arm bodies, and more particularly, to an articulated manipulator composed of a coaxial joint part that coaxially and rotatably connects two adjacent arm bodies, and an orthogonal joint part that rotatably connects one arm body to the other arm body.

BACKGROUND ART

An oblique joint of a conventional erectable manipulator can be folded up, and the manipulator can be disposed even in a narrow space. In order to realize a hollow oblique joint, a hollow harmonic drive reduction gear mechanism is provided (see Patent Document 1). Further, in order to drive the oblique joint, the power of a rotary axis of a motor to the speed-reduction mechanism is transmitted by a spur gear in a case where the rotation axis is parallel to the rotation axis of a joint, and is transmitted by a bevel gear in the case of inclination (see Patent Document 2).

FIG. 4 is a view showing a manipulator of Patent Document 1. In FIG. 4, 20 is an articulated manipulator, C1 is a first arm body, C2 is a second arm body, C3 is a third arm body, C4 is a fourth arm body, C5 is a fifth arm body, and C6 is a sixth arm body. The arm bodies are connected together so as to be rotatable around the rotation axes tilted at 45 degrees. In the articulated manipulator 20, the position and posture of a hand apparatus that are provided at the sixth arm body C6 (not shown) can be changed by rotating the arm bodies C1 to C6, respectively. Further, the first arm body C1 and the second arm body C2, the second arm body C2 and the third arm body C3, the third arm body C3 and the fourth arm body C4, and the fifth arm body C5 and the sixth arm body C6 are bent at 90 degrees with respect to each other. From this posture, if the second arm body C2 is operated with respect to the third arm body C3, and the fourth arm body C4 is operated with respect to the third arm body C3, the position of the sixth arm body C6 can be kept away from the first arm body C1 in the lateral direction Y, and can be made small in the height direction Z. This enables the sixth arm body C6 to be moved in the lateral direction Y in a state where the posture of the sixth arm body C6 is maintained, and the distance in the longitudinal direction Z between the sixth arm body C6 and a base 21 is short. As such, the oblique joint of the conventional manipulator can be folded up, and the manipulator can be disposed even in a narrow space. Further, FIG. 5 is a view showing a joint mechanism of a robot according to Patent Document 2. In FIG. 5, the rotation of a motor 12 drives an oblique joint 6 via bevel gears 40 and 42. As such, the oblique joint of the conventional manipulator drives joints via a gear device.

Patent Document 1: JP-A-2004-148449
Patent Document 2: JP-A-2003-025269

DISCLOSURE OF THE INVENTION

Problem to be Solved by the Invention

However, since the conventional erectable manipulator like Patent Document 1 has the oblique joint, the axis operation thereof is different from that of an industrial robot having a general orthogonal joint. Thus, if the axis manipulation is performed with the same movement axis and travel distance as those of an industrial robot having a conventional general orthogonal joint, there is a problem in that the axis is operated in an unintentional direction and manipulation teaching time is prolonged. Further, like Patent Document 2, the gear is used in order to realize the oblique joint. However, there is a problem in that operation sound increases as the number of rotations increases and the operation speed of a robot cannot be increased. Moreover, since the motor and a driving unit are coupled together by gears, it is difficult to shorten and install an arm in a narrow space. Further, in the configuration like Patent Document 2, it is necessary to dispose the motor between a cylindrical member that is an outer shell of the arm, and the joint part (position of the motor 12), and the external diameter of the arm cannot be made small. Further, when a number of linear bodies required for applications are provided in a hollow portion of the joint part, the dimension of an area where the motor is installed becomes smaller. As a result, there is also a problem in that a high-output motor cannot be adopted, and the operation speed or portable mass of a robot does not increase. On the contrary, when the high-output motor is installed, there is a problem in that the arm profile becomes large, the diameter of the hollow portion cannot be secured, and application cables cannot be provided.

The invention has been made in view of such problems. It is thus an object of the invention to provide a manipulator that facilitates a teaching method, improves the operation speed of an arm, and enables a heavy load to be mounted in a narrow space.

Means for Solving the Problem

In order to solve the above problems, the invention is configured as follows.

According to a first aspect of the invention, an articulated manipulator comprises: a plurality of arm bodies provided in series; and joint parts rotatably connecting two adjacent arm bodies of the plurality of arm bodies, wherein the joint parts are provided such that rotation axes of the adjacent joint parts intersect each other at right angles. That is, unlike a conventional six-axis articulated manipulator, the rotation axes of some adjacent joint parts among six axes are not configured to face in the same direction.

According to a second aspect of the invention, an articulated manipulator comprises: a plurality of arm bodies provided in series; and joint parts rotatably connecting two adjacent arm bodies of the plurality of arm bodies, wherein the joint parts are provided such that rotation axes of the adjacent joint parts intersect each other at right angles on the same plane. That is, the rotation axes of the joint parts that rotate the plurality of arm bodies can be aligned on the same plane.

According to a third aspect of the invention, as set forth in the first or second aspect, the joint parts rotatably drive the arm bodies by actuators in which a reducer and a servo motor are connected together such that a rotation axis of the servo motor and a rotation axis of the reducer are the same axis. That is, a transmission mechanism such as gears is not provided between the reducer and the servo motor, unlike the conventional joint parts.

According to a fourth aspect of the invention, as set forth in the third aspect, the actuators are configured by integrally forming the servo motor and the reducer. That is, the actuators are provided in which the servo motor and the reducer are integrally formed.

According to a fifth aspect of the invention, as set forth in the third or fourth aspect, hollow holes are formed around the rotation axis of the servo motor and the rotation axis of the reducer in each of the actuators. That is, there are provided the actuators that have through holes that extend in the axial direction of the actuators by forming hollow holes, which extend in the axial direction, in the rotation axes of the servo motor and the reducer, respectively.

According to a sixth aspect of the invention, as set forth in the fifth aspect, linear bodies are inserted into the hollow holes, and are disposed so as to sequentially pass through the plurality of arm bodies and the joint parts. That is, the linear bodies such as cables are disposed so as to be inserted into the hollow holes of the arm bodies instead of going around the outside (outbound) of the articulated manipulator.

According to a seventh aspect of the invention, as set forth in the sixth aspect, the linear bodies are a power line and a signal line of the servo motor. That is, the linear bodies include a power line and a signal line required for the servo motor constituting each joint part.

According to an eighth aspect of the invention, as set forth in the sixth aspect, the linear bodies are a power line, a signal line, and a fluid tube of an end effector connected at a tip of the plurality of arm bodies. That is, the linear bodies include a power line, a signal line, and a fluid tube of an end effector connected at a tip of an arm.

According to a ninth aspect of the invention, as set forth in the seventh or eighth aspect, one end of the plurality of arm bodies is provided with a base body fixed to an installation surface where the articulated manipulator is installed, and a panel on which the linear bodies are relayed is installed in the base body. That is, the linear bodies are connected to a relay panel of the base body, and are connected to a controller of the manipulators, a fluid source of fluid, or the like, via the relay panel.

According to a tenth aspect of the invention, as set forth in the sixth aspect, the linear bodies are connected so as to be brought into contact with or separated from each other by a connector at least in one place inside the plurality of arm bodies. That is, the linear bodies are detachably connected by the connector in any position inside the arm bodies.

According to an eleventh aspect of the invention, as set forth in the tenth aspect, the linear bodies are connected so as to be brought into contact with or separated from each other by the connector in the vicinity of the hollow holes. That is, the linear bodies that come out of the hollow holes are detachably connected by the connector in any position inside the arm bodies.

According to a twelfth aspect of the invention, an articulated manipulator comprises: a plurality of arm bodies provided in series; and joint parts rotatably connecting two adjacent arm bodies of the plurality of arm bodies, wherein a base body fixed to an installation surface where the articulated manipulator is installed is connected to one end of the plurality of arm bodies, and said one end of the plurality of arm bodies is rotatably supported by the base body, wherein the plurality of arm bodies are provided such that rotation axes of the adjacent joint parts intersect each other at right angles on the same plane, and wherein when the plurality of arm bodies are all erected with respect to the installation surface, each of actuators constituting axes parallel to the installation surface in a group of rotation axes that intersect each other at right angles is provided such that an axis adjacent to each of the axes parallel to the installation surface passes through almost the center of the length of the actuator. That is, a base body fixed to an installation surface is provided, and one end of the plurality of arm bodies is rotatably connected to the base body, and the rotation axes of the joint parts that rotatably connect the plurality of arm bodies are configured so as to intersect each other at right angles, and the rotation axes of the joint parts that rotate the plurality of arm bodies can be aligned on the same plane. Therefore, when the plurality of arm bodies are all erected with respect to the installation surface, an actuator that drives a rotation axis parallel to the installation surface is installed in a position where a rotation axis (an adjacent axis) adjacent to the rotation axis passes through almost the center of the length of the actuator virtually.

According to a thirteenth aspect of the invention, as set forth in the twelfth aspect, the joint parts rotatably drive the arm bodies by actuators in which a reducer and a servo motor are connected together such that a rotation axis of the servo motor and a rotation axis of the reducer are the same axis. That is, a transmission mechanism such as gears is not provided between the reducer and the servo motor, unlike the conventional joint parts.

According to a fourteenth aspect of the invention, as set forth in the thirteenth aspect, the actuators are configured by integrally forming the servo motor and the reducer. That is, the actuators are provided in which the servo motor and the reducer are integrally formed.

According to a fifteenth aspect of the invention, as set forth in the thirteenth or fourteenth aspect, hollow holes are formed around the rotation axis of the servo motor and the rotation axis of the reducer in each of the actuators. That is, there are provided the actuators that have through holes that extend in the axial direction of the actuators by forming hollow holes, which extend in the axial direction, in the rotation axes of the servo motor and the reducer, respectively.

According to a sixteenth aspect of the invention, as set forth in the fifteenth aspect, linear bodies are inserted into the hollow holes, and are disposed so as to sequentially pass through the plurality of arm bodies and the joint parts. That is, the linear bodies such as cables are disposed so as to be inserted into the hollow holes of the arm bodies instead of going around the outside (outbound) of the articulated manipulator.

According to a seventeenth aspect of the invention, as set forth in the sixteenth aspect, the linear bodies are a power line and a signal line of the servo motor. That is, the linear bodies include a power line and a signal line required for the servo motor constituting each joint part.

According to an eighteenth aspect of the invention, as set forth in the sixteenth aspect, the linear bodies are a power line, a signal line, and a fluid tube of an end effector connected at a tip of the plurality of arm bodies. That is, the linear bodies include a power line, a signal line, and a fluid tube of an end effector connected at a tip of an arm.

According to a nineteenth aspect of the invention, as set forth in the seventeenth or eighteenth aspect, a panel on which the linear bodies are relayed is installed in the base body. That is, the linear bodies are connected to a relay panel of the base body, and are connected to a controller of the manipulators, a fluid source of fluid, or the like, via the relay panel.

According to a twentieth aspect of the invention, as set forth in the sixteenth aspect, the linear bodies are connected so as to be brought into contact with or separated from each other by a connector at least in one place inside the plurality of arm bodies. That is, the linear bodies are detachably connected by the connector in any position inside the arm bodies.

According to a twenty-first aspect of the invention, as set forth in the sixteenth aspect, the linear bodies are connected so as to be brought into contact with or separated from each other by the connector in the vicinity of the hollow holes. That is, the linear bodies that come out of the hollow holes are detachably connected by the connector in an arbitrary position inside the arm bodies.

According to a twenty-second aspect of the invention, as set forth in the sixteenth aspect, in the hollow hole of the actuator constituting each of a group of rotation axes parallel to the installation surface, the linear bodies are fixed so as to be bent by clamp members in the vicinity of the hollow hole into which the linear bodies are inserted, and the linear bodies are fixed by the clamp members such that protruding distances of the bent portions from the axes adjacent to the axis parallel to the installation surface are almost the same in the vicinity of the hollow hole. That is, the linear bodies are bent and clamped in the vicinity of a hollow hole of an actuator of a rotation axis parallel to the installation surface so as to be directed to an actuator of a rotation axis adjacent to the rotation axis. The distances of the bent portions, which protrude from both ends of the hollow holes, from the adjacent rotation axis become equal the distances from the adjacent rotation axis.

According to a twenty-third aspect of the invention, as set forth in the twenty-second aspect, each of the plurality of arm bodies is configured such that its lower portion is connected to an actuator that drives an adjacent rotation axis of the adjacent joint parts, its internal space meanders so as to be away from the adjacent rotation axis and receives the bent portions of the linear bodies, and its upper portion holds an actuator that drives a next rotation axis of the adjacent joint parts. Thus, by forming the arm bodies in a serpentine shape, the width of the manipulator can be made small.

According to a twenty-fourth aspect of the invention, as set forth in the twenty-second aspect, each of the plurality of arm bodies is constructed so as to be divided into a rigid-body portion that receives the joint part, and a cover portion that receives the bent portions of the linear bodies, and the cover portion is formed of a resin material that is lighter than material of the rigid-body portion. That is, each arm body is divided into a portion that does not affect the strength of each arm body, that is, a portion that covers the bent portions of the linear body, which is used as a cover portion, and a rigid-body portion that requires the strength of receiving a joint part, etc. The cover portion is formed of a resin material that is lighter than material of the rigid-body portion.

According to a twenty-fifth aspect of the invention, as set forth in the first, second or twelfth aspect, the plurality of arm bodies are six arm bodies composed of first to sixth arm bodies, and the joint parts rotatably are composed of actuators in which a reducer and a servo motor are connected together such that a rotation axis of the servo motor and a rotation axis of the reducer are the same axis, wherein one end of the first arm body is connected to a base body fixed to an installation surface where the articulated manipulator is installed, and the first arm body is rotated by a first actuator provided in the base body, one end of the second arm body is connected to the other end of the first arm body, and the second arm body is rotated by a second actuator provided in the first arm body, one end of the third arm body is connected to the other end of the second arm body, and the third arm body is rotated by a third actuator provided in the second arm body, one end of the fourth arm body is connected to the other end of the third arm body, and the fourth arm body is rotated by a fourth actuator provided in the third arm body, one end of the fifth arm body is connected to the other end of the fourth arm body, and the fifth arm body is rotated by a fifth actuator provided in the fourth arm body, one end of the sixth arm body is connected to the other end of the fifth arm body, and the sixth arm body is rotated by a sixth actuator provided in the fifth arm body, and a seventh actuator is provided at the other end of the sixth arm body, and an output axis of a reducer of the seventh actuator is provided with a mechanism that attaches an end effector. That is, the preset articulated manipulator is composed of so-called seven-axis manipulators, these seven axes are configured so as to be orthogonal to each other, and the end effector is attached.

According to a twenty-sixth aspect of the invention, as set forth in the twenty-fifth aspect, the first to seventh actuators are configured such that a shape and capacity of the actuators become small sequentially from the first actuator. That is, an actuator is closer to the tip than the installation surface and thus becomes a smaller actuator.

According to a twenty-seventh aspect of the invention, as set forth in the twenty-fifth aspect, in the first to seventh actuators, the first and second actuators; the third and fourth actuators; and the fifth, sixth, and seventh actuators are configured so as to have the same shape and capacity, respectively. That is, the actuators are configured so as to be common to one another as much as possible.

According to a twenty-eighth aspect of the invention, as set forth in the twenty-fifth aspect, the spacing between the rotation axes of the fourth and sixth actuators is made smaller than the spacing between the rotation axes of the second and fourth actuators. That is, the arm bodies closer to the tip are configured with shorter spacing.

According to a twenty-ninth aspect of the invention, a robot system comprises: the articulated manipulator as set forth in the first, second or twelfth aspect; and a controller for controlling the articulated manipulator. That is, the manipulator and the controller are configured as a one-to-one set.

According to a thirtieth aspect of the invention, as set forth in the first, second or twelfth aspect, any one of a welding torch, a welding gun, a painting gun, a handling hand, and a sealing gun is mounted on a tip of the plurality of arm bodies. That is, this invention is configured such that an end effector of a workpiece to which the operation of this manipulator can be applied is provided at the tip of an arm body.

According to a thirty-first aspect of the invention, a double-armed manipulator wherein two articulated manipulators according to the first, second or twelfth aspect are installed in a common base body. That is, the manipulator is configured as a so-called humanoid manipulator.

According to a thirty-second aspect of the invention, as set forth in the thirty-first aspect, a controller that controls the two articulated manipulators is built into the base body. That is, this invention is configured such that two articulated manipulator are controlled by one common controller included in the case.

Advantage of the Invention

According to the first aspect, the manipulator has a plurality of arm bodies provided substantially in series, joint parts rotatably connecting two adjacent arm bodies, and the joint parts in which the slope of rotation axes of the adjacent joints are 90 degrees, so that a robot teaching method can be facilitated.

According to the second aspect, the rotation axes of the adjacent joint parts are provided so as to intersect each other at right angles. That is, all the rotation axes of the joint parts can be aligned on the same plane. Thus, the arm bodies can be moved so as to be arranged substantially linearly, and can be installed even in a narrow space. Further, the height of a robot can be kept low if necessary. Further, operation speed and portable mass can be made high.

According to the third aspect, since a transmission mechanism such as gears is not provided between the reducer and the servo motor, unlike the conventional joint parts, the noise of gear portions decreases, and the space for these portions also becomes unnecessary.

According to the fourth aspect, since the actuators are configured compactly and flatly in the direction of the rotation axes of the joints, the dimension of an arm can be made small, and installation to a space that is narrower as a whole is allowed.

According to the fifth and sixth aspects, since linear bodies such as cables can be configured so as to pass through the hollow holes, it is not necessary to drag the cables to the outside of the manipulator, and thereby, the possibility of any interference between surrounding things and the linear bodies becomes little. As a result, the possibility of disconnection of the linear bodies decreases.

According to the seventh aspect, cables such as a power line of a motor required for the manipulator itself are also dragged to the inside of an arm, and the cables pass through the center of the rotation axis. Therefore, the twist of the cables becomes small compared with being dragged in a position distant from the rotation axis, and thus the possibility of disconnection becomes small.

According to the eighth aspect, a power line or the like for an end effector connected to the tip of an arm body is also configured so as to be inserted into the inside of the manipulator, so that the possibility of interference of the manipulator with surrounding things decreases.

According to the ninth aspect, the linear bodies are connected to a controller or the like via a relay panel of the base body. Thus, for example, when the manipulator is used as a painting robot, even if the manipulator is installed in a painting area in a dangerous atmosphere, and the controller is installed in a non-dangerous atmosphere isolated from the dangerous atmosphere, the manipulator can be configured easily.

According to the tenth aspect, since the linear bodies can be separated in any position inside an arm body, workability becomes easy if the linear bodies are provided so that they can be separated from each other in a required place, for example, at the time of maintenance.

According to the eleventh aspect, since the linear bodies are provided to be separated from each other in the vicinity of the hollow holes, even if a connector has such a size that it cannot pass through the hollow holes, the actuators or the arm bodies can be separated easily. Further, as for the size of a hollow portion, the diameter of a section occupied by the linear bodies need to be considered, and it is possible to dispose a maximum number of cables irrespective of the size of the connector.

According to the twelfth aspect, since an actuator of a rotation axis parallel to the installation surface is installed so as to be almost in a central position with respect to an adjacent rotation axis (that is, axis that becomes vertical to the installation surface), even if a portion of the actuator parallel to the installation surface is rotated by the adjacent rotation axis, the rotation diameter during rotation becomes small.

According to the thirteenth aspect, in addition to the effect of the twelfth aspect, the arm bodies can be moved so as to be arranged substantially linearly with respect to the installation surface. In this state, the rotation diameter, i.e., the minimum rotation diameter of the manipulator can be suppressed small when a set of the arm bodies is rotated with respect to a base surface.

According to the fourteenth aspect, since a transmission mechanism such as gears is not provided between the reducer and the servo motor, unlike the conventional joint parts, the noise of gear portions decreases, and the space for these portions also becomes unnecessary.

According to the fifteenth aspect, since the actuators are configured compactly and flatly in the direction of the rotation axes of the joints, the dimension of an arm can be made small, and installation to a space that is narrower as a whole is allowed. According to the sixteenth aspect, since linear bodies such as cables can be configured so as to pass through the hollow holes, it is not necessary to drag the cables to the outside of the manipulator. Therefore, the possibility of any interference between surrounding things and the linear bodies becomes little. As a result, the possibility of disconnection of the linear bodies decreases.

According to the seventeenth aspect, since linear bodies such as cables can be configured so as to pass through the hollow holes, it is not necessary to drag the cables to the outside of the manipulator. Therefore, the possibility of any interference between surrounding things and the linear bodies becomes little. As a result, the possibility of disconnection of the linear bodies decreases.

According to the eighteenth aspect, cables, such as a power line, of a motor required for the manipulator itself are also dragged to the inside of an arm, and the cables pass through the center of the rotation axis. Therefore, the twist of the cables becomes small compared with being dragged in a position distant from the rotation axis, and thus the possibility of disconnection becomes small.

According to the nineteenth aspect, since a power line or the like for an end effector connected to the tip of an arm body is also configured so as to be inserted into the inside of the manipulator, the possibility of interference of the manipulator with surrounding things decreases.

According to the twentieth aspect, the linear bodies are connected to a controller or the like via a relay panel of the base body. Thus, for example, when the manipulator is used as a painting robot, even if the manipulator is installed in a painting area in a dangerous atmosphere, and the controller is installed in a non-dangerous atmosphere isolated from the dangerous atmosphere, the manipulator can be configured easily.

According to the twenty-first aspect, since the linear bodies can be separated in any position inside an arm body, workability becomes easy if the linear bodies are configured to be separated from each other in a required place, for example, at the time of maintenance.

According to the twenty-second aspect, since the linear bodies are provided to be separated from each other in the vicinity of the hollow holes, even if a connector has such a size that it cannot pass through the hollow holes, the actuators or the arm bodies can be separated easily. Further, as for the size of a hollow portion, only the diameter of a section occupied by the linear bodies need to be considered, and it is possible to dispose a maximum number of cables irrespective of the size of the connector.

According to the twenty-third aspect, bent portions of linear bodies that have passed through a hollow hole of a rotation axis parallel to the installation surface can be configured such that the distances from a rotation axis adjacent to the above rotation axis are almost the same in vicinity of the hollow hole, and therefore a required rotation diameter can be made smaller.

According to the twenty-fourth aspect, portions do not have a great influence on the strength of each arm body, and also the portions can be provided as separate parts and can be made light using a resinous material. Therefore, the load to the actuators can be alleviated, the actuators with small capacity can be used, and thereby, the whole manipulators can be designed compactly.

According to the twenty-fifth aspect, by providing seven axes as the number of axes of the manipulator, the number of axes in which a redundant axis is added to a six-axis manipulator required in a three-dimensional space is provided. Thus, it is possible to provide a manipulator capable of performing work even in a narrow space.

According to the twenty-sixth aspect, actuators closer to the tip are made to have smaller capacity and shape sequentially. Accordingly, the actuators at the tip can be designed small, and thereby, the tip of the manipulator can enter a narrower space.

According to the twenty-seventh aspect, since the actuators are configured so as to be common to one another as much as possible, the cost of the actuators can be reduced, and the fabrication thereof can be simplified.

According to the twenty-eighth aspect, the actuators closer to the tip can be designed small, and thereby, the tip of the manipulator can enter a narrower space.

According to the thirty-first aspect, the manipulator is configured as a so-called humanoid manipulator, and thereby the working state similar to human work can be realized.

According to the thirty-second aspect, two manipulators can be made to cooperate with each other

BEST MODE FOR CARRYING OUT THE INVENTION

Hereinafter, embodiments of the invention will be described with reference to the drawings.

Embodiment 1

Figure 1:
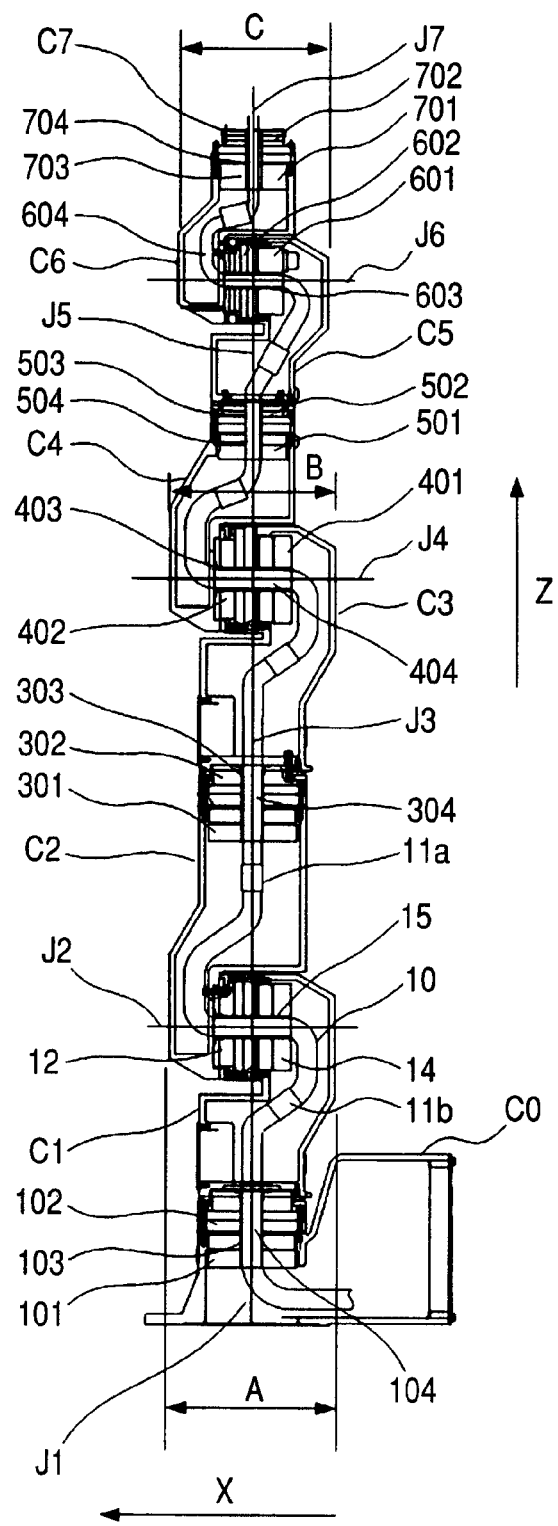
FIG. 1 is a sectional side view of a manipulator apparatus according to a first embodiment of the invention.

FIG. 1 is a sectional side view of a manipulator apparatus showing a first embodiment of the invention. In FIG. 1, C1 is a first arm body, C2 is a second arm body, C3 is a third arm body, C4 is a fourth arm body, C5 is a fifth arm body, and C6 is a sixth arm body. C7 is a seventh arm body. C0 is a base body that supports the first arm body C1, and is a portion that fixes a manipulator apparatus to an installation surface that is not shown. The respective arm bodies rotate relatively by joint parts as will be described later. FIG. 1 shows an erected state in which the base body C0 is installed on a floor surface, and the longitudinal direction of each of the above arm bodies is directed to top and bottom directions. Further, a panel (not shown) that relays linear bodies from servo motors or end effectors to be described later is installed on the base body C0. Moreover, controllers and their linear bodies of the manipulator apparatus that is not shown similarly are connected via the panel by cables (not shown), and the operation of the servo motors or the end effectors in the manipulator apparatus is controlled. The manipulator apparatus and controllers that are connected in this way are constituted as a robot system.

The first arm C1 rotates about a joint axis J1, the second arm C2 rotates about a joint axis J2, the third arm C3 rotates about a joint axis J3, the fourth arm C4 rotates about a joint axis J4, the fifth arm C5 rotates about a joint axis J5, the sixth arm C6 rotates about a joint axis J6, and the seventh arm C7 rotates about a joint axis J7. In addition, the seventh arm C7 is also a member that connects end effectors to be described later.

Also, the joint axis J2 is orthogonal to the joint axis J1, the joint axis J3 is orthogonal to the joint axis J2, the joint axis J4 is orthogonal to the joint axis J3, the joint axis J5 is orthogonal to the joint axis J4, the joint axis J6 is orthogonal to the joint axis J5, and the joint axis J7 is orthogonal to the joint axis J6. According to the present axis configuration, since a motion orthogonal to an axis that supports a motion axis is obtained, efficient teaching that is close to the same teaching manipulation method as a conventional general six-axis industrial robot is allowed.

Further, in this embodiment, the centers of rotation of the joint axis J1, the joint axis J3, the joint axis J5, and the joint axis J7 are configured so as to be on the same line when the manipulator is erected. According to the present axis configuration, minimum dimensions are taken in order to install the manipulator in a narrow space. That is, the projected area from a top view of the manipulator is minimized. However, it is also possible to give offset dimensions to the centers of rotation of the joint axis J1, the joint axis J3, the joint axis J5, and the joint axis J7.

The joint axis J1 is driven by a reducer 102 that reduces the rotation speed of a servo motor 101, and the centers of rotation of the servo motor 101 and the reducer 102 coincide with the rotation axis of the joint axis J1. Further, a hollow hole 103 is formed in the centers of rotation of the servo motor 101 and the reducer 102, and a linear body 104 is disposed so as to pass through the hollow hole 103.

The joint axis J2 is driven by a reducer 12 that reduces the rotation speed of a servo motor 14, and the centers of rotation of the servo motor 14 and the reducer 12 coincide with the rotation axis of the joint axis J2. Further, a hollow hole 15 is formed in the centers of rotation of the servo motor 14 and the reducer 12, and a linear body 10 is disposed so as to pass through the hollow hole 15.

The joint axis J3 is driven by a reducer 302 that reduces the rotation speed of a servo motor 301, and the centers of rotation of the servo motor 301 and the reducer 302 coincide with the rotation axis of the joint axis J3. Further, a hollow hole 303 is formed in the centers of rotation of the servo motor 301 and the reducer 302, and a linear body 304 is disposed so as to pass through the hollow hole 303.

The joint axis J4 is driven by a reducer 402 that reduces the rotation speed of a servo motor 401, and the centers of rotation of the servo motor 401 and the reducer 402 coincide with the rotation axis of the joint axis J4. Further, a hollow hole 403 is formed in the centers of rotation of the servo motor 401 and the reducer 402, and a linear body 404 is disposed so as to pass through the hollow hole 403.

The joint axis J5 is driven by a reducer 502 that reduces the rotation speed of a servo motor 501, and the centers of rotation of the servo motor 501 and the reducer 502 coincide with the rotation axis of the joint axis J5. Further, a hollow hole 503 is formed in the centers of rotation of the servo motor 501 and the reducer 502, and a linear body 504 is disposed so as to pass through the hollow hole 503.

The joint axis J6 is driven by a reducer 602 that reduces the rotation speed of a servo motor 601, and the centers of rotation of the servo motor 601 and the reducer 602 coincide with the rotation axis of the joint axis J6. Further, a hollow hole 603 is formed in the centers of rotation of the servo motor 601 and the reducer 602, and a linear body 604 is disposed so as to pass through the hollow hole 603.

The joint axis J7 is driven by a reducer 702 that reduces the rotation speed of a servo motor 701, and the centers of rotation of the servo motor 701 and the reducer 702 coincide with the rotation axis of the joint axis J7. Further, a hollow hole 703 is formed in the centers of rotation of the servo motor 701 and the reducer 702, and a linear body 704 is disposed so as to pass through the hollow hole 703.

Each of the linear bodies includes signal lines, such as a power line and an encoder, of each of the servo motors. Particularly, the linear body 704 is a linear body composed of a power line, a signal line, a tube mainly involving fluid, such as air, for an end effector.

As described above, in this manipulator apparatus, the servo motor 101 and the reducer 102 that drive the axis J1 are installed in the base body C0, and one end of the first arm body C1 is connected to and rotated by an output shaft of the reducer 102. The servo motor 14 and the reducer 12 are installed at the other end of the first arm body, and one end of the second arm body C2 is connected to and rotated by an output shaft of the reducer 12. The servo motor 301 and the reducer 302 are installed at the other end of the second arm body C2, and one end of the third arm body C3 is connected to and rotated by an output shaft of the reducer 302. The servo motor 401 and the reducer 402 are installed at the other end of the third arm body C3, and one end of the fourth arm body C4 is connected to and rotated by an output shaft of the reducer 402. The servo motor 501 and the reducer 502 are installed at the other end of the fourth arm body C4, and one end of the fifth arm body C5 is connected to and rotated by an output shaft of the reducer 502. The servo motor 601 and the reducer 602 are installed at the other end of the fifth arm body C5, and one end of the sixth arm body C6 is connected to and rotated by an output shaft of the reducer 602. The servo motor 701 and the reducer 702 are installed at the other end of the sixth arm body C6, and the seventh arm body C7 to which an end effector (not shown) is to be connected is connected to an output shaft of the reducer 702. The end effector is a means that allows this manipulator apparatus to perform work, for example, a handling hand, a welding torch for Tig welding or arc welding, a gun for spot welding, a coating gun that ejects a fluid coating material, or the like.

A servo motor and a reducer that drive a joint axis are formed integrally so that the rotation axes thereof may become the same, and constitute a flat-type actuator. Of course, although it is not necessary to integrally form these, the fact that the servo motor and the reducer are formed integrally and made flat axially contributes to miniaturization of this articulated manipulator. In this actuator, a harmonic drive gear is used for the reducer. The schematic structure of the reducer and the servo motor is known, and the description thereof is omitted. A structure in which the reducer and the servo motor are integrated is known, and the description thereof is omitted similarly. The actuators that drive the axis J1 to the axis J7 are different from each other in the capacity of motors, but are almost the same in configuration.

Figure 6:
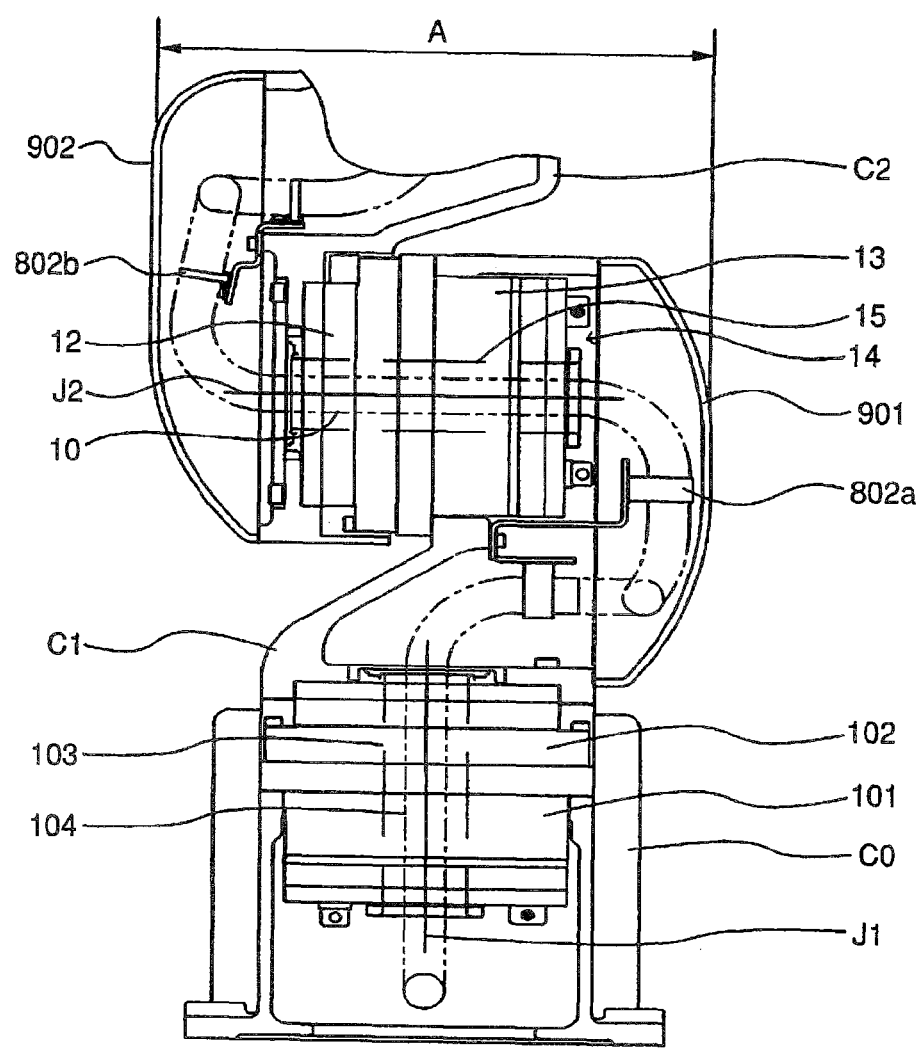
FIG. 6 is a detailed view showing portions of the axes J1 and J2 in FIG. 1 in an enlarged manner.

Particularly, an arrangement of the actuators that constitute the axes J2, J4, and J6 will be explained. Like FIG. 1, these actuators are installed such that each of the axes J1, J3, and J5 passes through almost the middle of the length of each actuator in the direction of the rotation axis thereof. This will be explained with reference to FIG. 6. FIG. 6 is a detailed view showing portions of the axes J1 and J2 in FIG. 1 in an enlarged manner. That is, for example, the actuator is installed such that the axis J1 passes through almost the half position of the length of the actuator composed of the servo motor 14 and the reducer 12 in the axis J2. Thereby, both ends of the hollow hole 15 will be installed in positions almost equal to each other with respect to the axis J1. In the axis J2, the linear body 10 is bent by clamps 802a and 802b so as to draw a circular arc at both ends of the hollow hole 15. Further, in order to obtain this configuration, the arm bodies Cl, C3, and C5 have a substantially hollow shape, and the lower end surfaces of the arm bodies are connected to the output shafts of the reducers of the axes (J1, J3, and J5) directly below (directly before) the arm bodies like FIG. 1, the internal spaces of the arm bodies meander so as to be separated from the axes directly below the arm bodies, and receive the bent portions of the linear bodies, and the upper portions of the arm bodies hold the actuators so as to be perpendicular to the axes directly below the arm bodies, and the protruding distances of the actuators and linear bodies of the axes J2, J4, and J6 with respect to the axes directly below the arm bodies are almost the same. On the other hand, although the arm bodies C2, C4, and C6 has almost the same shape as the arm bodies Cl, C3, and C5, the arm bodies C2, C4, and C6 are connected in an inverted state. For example, the arm body C2 is connected by the axis J2 in a state of being inverted vertically with respect to the arm body Cl. In FIG. 6, reference numeral 13 denotes a J2-axis motor unit.

Accordingly, when the linear bodies 10, 404, and 604 that have passed through the hollow holes of the actuators of the axes J2, J4, and J6 are discharged and bent from both ends of the hollow holes 15, 403, and 603, they protrude at almost the same distance from the axes J1, J3, and J5 at both ends of each hollow hole. Then, the dimension A, dimension B, and dimension C of FIG. 1 showing the outside dimensions in the axes J2, J4, and J6 of the arms formed so as to cover these linear bodies are maintained at almost the same dimension about the axes J1, J3, and J5, respectively. As a result, it is possible to reduce the radius of rotation during rotation to be determined by the dimension A, dimension B, and dimension C when the axes J1, J3, and J5 are rotated, respectively. Further, for example, when the axis J1 is rotated at the time of a pause (at the time of being erected) of an arm like FIG. 1, the minimum radius of rotation determined by the dimension A can be made small. Further, the area to an installation surface at this time also becomes small. Thereby, it is needless to say that the possibility of interference with an apparatus installed around the articulated manipulator is reduced.

Further, in the invention, all the articulations do not have gear mechanisms like Patent Document 2 between a servo motor and a reducer. Thus, even if the motor rotates at high speed, a quiet operation is allowed. Further, since all the axes adopt the flat actuators, the arm widths A, B, and C in the direction of X shown in FIG. 1 can be shortened. It is thus possible to install the manipulation in a narrow space. Further, since it is possible to make the motor of each joint have an outside dimension near the external diameter of a reducer. Thus, it is possible to significantly increase the diameter of a motor magnet and a core. Thus, it is possible to obtain a large-output motor, and it is possible to increase the driving load, speed, and accelerator of an actuator.

A linear body disposed in a hollow hole of each joint is connected by each connector before being in a hollow hole of the adjacent shaft. For example, in the axis J2, both ends of the linear body 10 are respectively connected to the linear body 104 that has passed through the axis J1 and to the linear body 304 that has passed through the axis J3 by connectors 11a and 11b. For this reason, in order to let a large-sized connector pass therethrough, the number of cables that can be disposed in a hollow portion is prevented from being constrained. Of course, in a case where there are few application cables, it is not necessary to perform relay by a connector, and the relay may be performed by an arbitrary joint part. This is because the cables of the axis J2 to the axis J7 passes through the axis J1, and the therefore, the axis J1 has many cables for driving the actuators, but an axis closer to the tip have a higher ratio occupied by the application cables.

Since required cables are disposed in an actuator hollow portion as described above, there is a case of being determined by a required hollow diameter rather than the capacity of a reducer or a motor. In cases other than such a case, it is possible to constitute at least the axes J1 to J3 with harmonic drive gear devices of the same capacity by adopting a light-weight material for an arm, or providing a motion angle limitation. Therefore, it is possible to obtain a manipulator having a small arm profile, and capable of being mounted on a narrow space. In FIG. 6, 901 and 902 denotes covers connected to the first arm body C1 and the second arm body C2. The third arm body C3 to the sixth arm body C6 have almost the same structure as the covers. Each of the covers is a portion attached to each arm body so as to cover a bent portion of the above linear body. As described above, since one end (lower end) of each arm body is connected to the reducer of the actuator of the shaft directly thereunder, and an actuator for rotating the shaft directly above the arm body is installed at the other end (upper end) of the arm body, each arm body is generally a rigid body. Thus, although each arm body is fabricated of stainless steel, an aluminum alloy, cast iron, or the like, a side portion of the arm body that covers the linear body does not contribute to the strength of the arm body largely. Accordingly, by forming a portion that covers the bent portion of the linear body in the shape of a cover that is a member separate from the arm body, and making the cover of a resin light-weight material, the weight of the arm body is made light, and the power load to the actuator is alleviated. Further, if this cover configuration is adopted, maintenance also improves.

Further, as described above, for example, in the actuators (FIG. 1) of the axes J1 to J3, it is undoubted that the power of an actuator that drive a shaft closer to the axis J1 is required much. However, it is needless to say that the same actuator is desirably used for the respective axes from the viewpoint of management at the time of manufacture of the actuator, or maintenance. Therefore, in the invention, for example, the actuators of the axis J1 and the axis J2, the axis J3 and the axis J4, and the axis J5, the axis J6, and axis J7 have almost the shape, and almost the same capacity. Accordingly, the spacing between the axis J4 and the axis J6 is made wider than the spacing between the axis J2 and the axis J4. Further, by adopting such a configuration, the length of an arm body closer to a tip (end effector side) of the articulated manipulator can be made shorter, and the tip can enter a narrow space.

The articulated manipulator of the invention configured as described above is used for an industrial robot. For example, handing, sealing, painting, or arc welding in a narrow workspace can be performed by connecting various hand apparatuses, i.e., end effectors to a free end of the articulated manipulator, and disposing hand apparatuses in target positions to operate the hand apparatuses.

Further, a so-called double-armed manipulator can be configured by preparing two articulated manipulators of the invention and making their base body C0 common to each other. In this case, the two manipulators may be controlled by one controller so as not to interfere with each other. Further, it is also conceivable that the double-armed manipulator is configured like both arms and body of a human by installing the two manipulators in the common base body C0 similarly to human arms, and accommodating and integrating a controller that controls the manipulators, in the common base body C0. By adopting such configurations in the above work, such as handling, sealing, painting, or arc welding, cooperation work using right and left arms like human arms can be performed.

Figure 3:
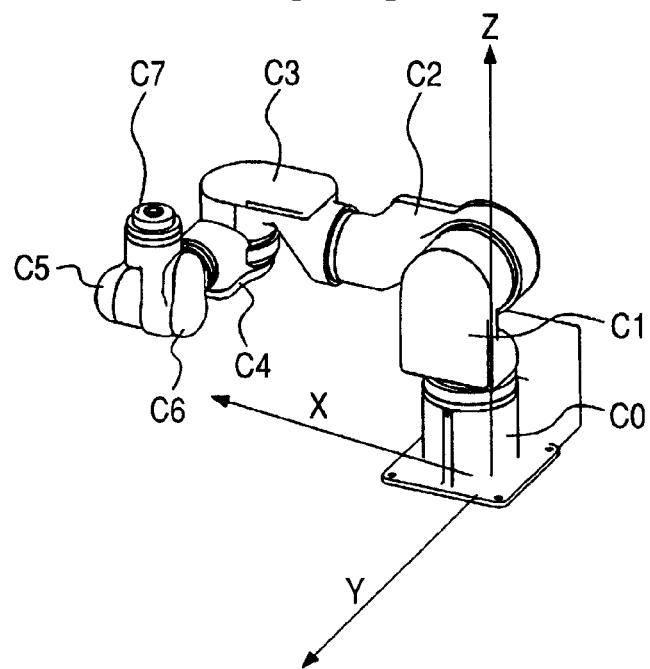
FIG. 3 is a perspective view showing the operation of the manipulator of the invention.
Figure 4:
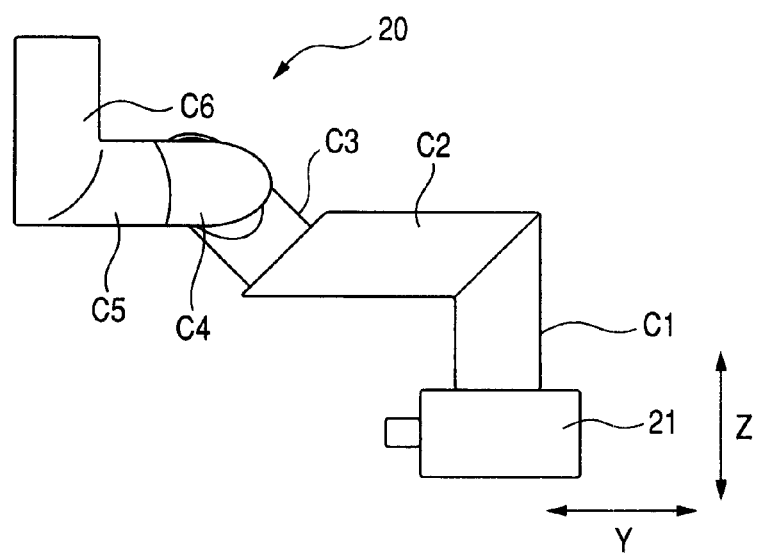
FIG. 4 is an external view of a conventional manipulator apparatus.
Figure 5:
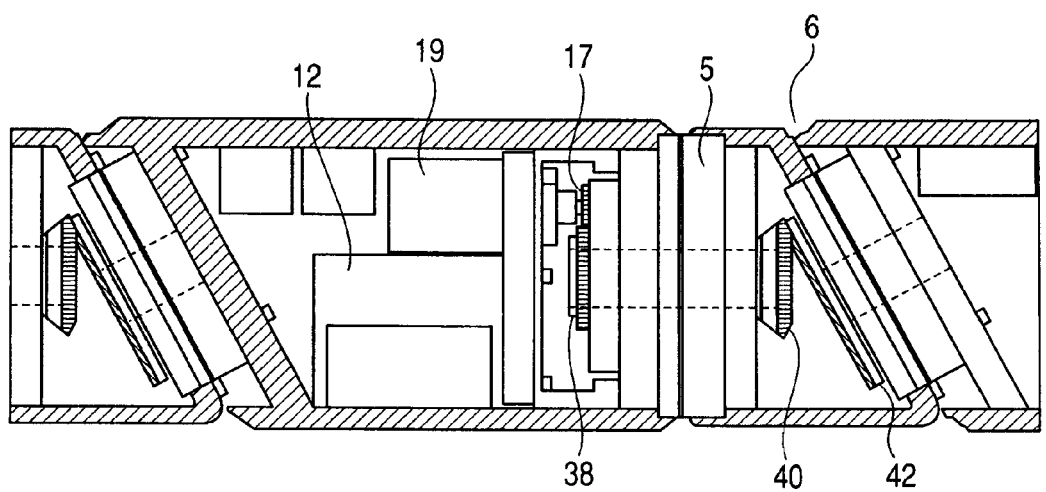
FIG. 5 is a side sectional view of joint parts of the conventional manipulator apparatus.

Further, in the articulated manipulators of the invention, as shown in FIG. 3, the first arm body C1 and the second arm body C2, the second arm body C2 and the third arm body C3, the third arm body C3 and the fourth arm body C4, and the fifth arm body C5 and the sixth arm body C6 are bent at 90 degrees with respect to each other, and if the second arm body C2 is operated in the direction of an obtuse angle with respect to the third arm body C3 from this posture, the position of the sixth arm body C6 can be kept away from the first arm body C1 in the lateral direction Y, and can be made small in the height direction Z. This enables the sixth arm body C6 to be moved in the lateral direction Y in a state where the posture of the sixth arm body C6 is maintained, and the distance in the longitudinal direction Z between the sixth arm body C6 and the base 21 is short.

Figure 2:
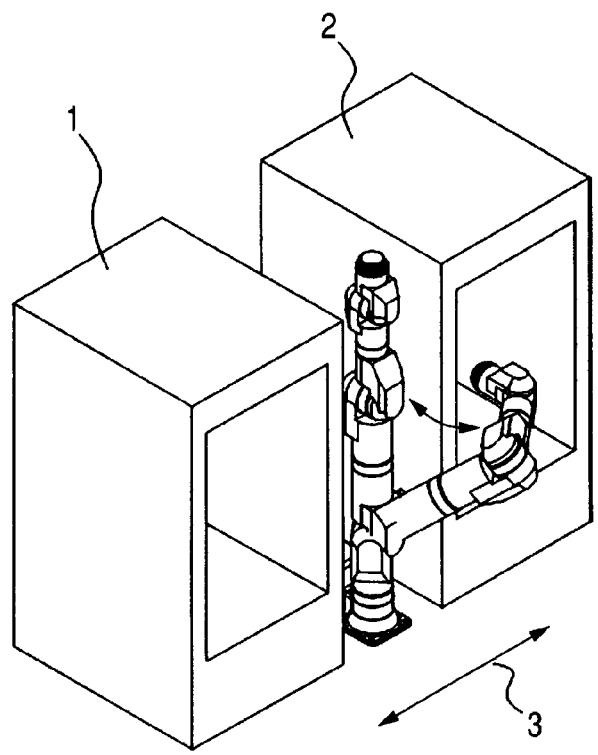
FIG. 2 is a perspective view showing the operation of the manipulator of the invention.

Further, in a case where the articulated manipulator of the invention is used for handling of a workpiece between processing machines, as shown in FIG. 2, the manipulator can be disposed in a dead space between a processing machine 1 and a processing machine 2. Since the front face of a processing machine is secured as a space 3 by which a worker passes in a case where the manipulator is not operated, a new space is not required in installing the manipulator. This posture is an installation state equivalent to a case where an obstruction exists between the angles formed by the joint axis J5 of the fifth arm body C5, and the joint axis J3 of the third arm body C3, in the posture shown in FIG. 3.

The invention claimed is:
1. An articulated manipulator comprising:
a base body fixed to an installation surface where the articulated manipulator is installed;
a first arm body having a first end portion, a second end portion opposite to the first end portion, and a first rotation axis that is a center axis of the first end portion;
a first joint part connecting the base body and the first end portion of the first arm body rotatably around the first rotation axis that is substantially perpendicular to the installation surface;
a second arm body having a third end portion, a fourth end portion opposite to the third end portion, and a second arm center axis that is a center axis of the fourth end portion;
a second joint part connecting the second end portion of the first arm body and the third end portion of the second arm body rotatably around a second rotation axis that is substantially parallel to the installation surface;
a third arm body having a fifth end portion, a sixth end portion opposite to the fifth end portion, and a third rotation axis that is a center axis of the fifth end portion; and
a third joint part connecting the fourth end portion of the second arm body and the fifth end portion of the third arm body rotatably around the third rotation axis that is substantially perpendicular to the second rotation axis and that is aligned with the second arm center axis,
wherein when the first, second and third arm bodies are all erected with respect to the installation surface, the first rotation axis, the second arm center axis, and the third rotation axis are substantially aligned with a center axis of the articulated manipulator.
2. The articulated manipulator according to claim 1, wherein the joint parts rotatably drive the arm bodies by actuators in which a reducer and a servo motor are connected together such that a rotation axis of the servo motor and a rotation axis of the reducer are the same axis.

3. The articulated manipulator according to claim 2, wherein the actuators are configured by integrally forming the servo motor and the reducer.

4. The articulated manipulator according to claim 3, wherein hollow holes are formed around the rotation axis of the servo motor and the rotation axis of the reducer in each of the actuators.

5. The articulated manipulator according to claim 2, wherein hollow holes are formed around the rotation axis of the servo motor and the rotation axis of the reducer in each of the actuators.

6. The articulated manipulator according to claim 5, wherein linear bodies are inserted into the hollow holes, and are disposed so as to sequentially pass through the plurality of arm bodies and the joint parts.

7. The articulated manipulator according to claim 6, wherein the linear bodies are a power line and a signal line of the servo motor.

8. The articulated manipulator according to claim 7, wherein a panel on which the linear bodies are relayed is installed in the base body.

9. The articulated manipulator according to claim 6, wherein the linear bodies are a power line, a signal line, and a fluid tube of an end effector connected at a tip of the plurality of arm bodies.

10. The articulated manipulator according to claim 9, wherein a panel on which the linear bodies are relayed is installed in the base body.

11. The articulated manipulator according to claim 6, wherein the linear bodies are connected so as to be brought into contact with or separated from each other by a connector at least in one place inside the plurality of arm bodies.

12. The articulated manipulator according to claim 6, wherein the linear bodies are connected so as to be brought into contact with or separated from each other by the connector in the vicinity of the hollow holes.

13. The articulated manipulator according to claim 6, wherein, in the hollow hole of the actuator constituting each of a group of rotation axes parallel to the installation surface, the linear bodies are fixed so as to be bent by clamp members in the vicinity of the hollow hole into which the linear bodies are inserted, and
the linear bodies are fixed by the clamp members such that protruding distances of the bent portions from the axes adjacent to the axis parallel to the installation surface are almost the same in the vicinity of the hollow hole.

14. The articulated manipulator according to claim 13, wherein each of the plurality of arm bodies is configured such that its lower portion is connected to an actuator that drives an adjacent rotation axis of the adjacent joint parts, its internal space meanders so as to be away from the adjacent rotation axis and receives the bent portions of the linear bodies, and its upper portion holds an actuator that drives a next rotation axis of the adjacent joint parts.

15. The articulated manipulator according to claim 13, wherein each of the plurality of arm bodies is constructed so as to be divided into a rigid-body portion that receives the joint part, and a cover portion that receives the bent portions of the linear bodies, and
the cover portion is formed of a resin material that is lighter than material of the rigid-body portion.

16. The articulated manipulator according to claim 1, wherein the plurality of arm bodies are six arm bodies composed of first to sixth arm bodies, and
the joint parts rotatably are composed of actuators in which a reducer and a servo motor are connected together such that a rotation axis of the servo motor and a rotation axis of the reducer are the same axis,
wherein one end of the first arm body is connected to a base body fixed to an installation surface where the articulated manipulator is installed, and the first arm body is rotated by a first actuator provided in the base body,
one end of the second arm body is connected to the other end of the first arm body, and the second arm body is rotated by a second actuator provided in the first arm body,
one end of the third arm body is connected to the other end of the second arm body, and the third arm body is rotated by a third actuator provided in the second arm body,
one end of the fourth arm body is connected to the other end of the third arm body, and the fourth arm body is rotated by a fourth actuator provided in the third arm body,
one end of the fifth arm body is connected to the other end of the fourth arm body, and the fifth arm body is rotated by a fifth actuator provided in the fourth arm body,
one end of the sixth arm body is connected to the other end of the fifth arm body, and the sixth arm body is rotated by a sixth actuator provided in the fifth arm body, and
a seventh actuator is provided at the other end of the sixth arm body, and an output axis of a reducer of the seventh actuator is provided with a mechanism that attaches an end effector.

17. The articulated manipulator according to claim 16, wherein the first to seventh actuators are configured such that a shape and capacity of the actuators become small sequentially from the first actuator.

18. The articulated manipulator according to claim 16, wherein, in the first to seventh actuators, the first and second actuators; the third and fourth actuators; and the fifth, sixth, and seventh actuators are configured so as to have the same shape and capacity, respectively.

19. The articulated manipulator according to claim 16, wherein the spacing between the rotation axes of the fourth and sixth actuators is made smaller than the spacing between the rotation axes of the second and fourth actuators.

20. A robot system comprising:
the articulated manipulator according to claim 1; and
a controller for controlling the articulated manipulator.

21. The articulated manipulator according to claim 1, wherein any one of a welding torch, a welding gun, a painting gun, a handling hand, and a sealing gun is mounted on a tip of the plurality of arm bodies.

22. A double-armed manipulator wherein two articulated manipulators according to claim 1 are installed in a common base body.

23. The double-armed articulated manipulator according to claim 22,
wherein a controller that controls the two articulated manipulators is built into the base body.

24. The articulated manipulator according to claim 1, wherein when the first, second and third arm bodies are all erected with respect to the installation surface, the first rotation axis, the second arm center axis, and the third rotation axis are alignable to be substantially coaxial with the center axis of the articulated manipulator.

* * * * *